(12) United States Patent
Zwezdaryk (10) Patent No.: US 6,892,673 B2
(45) Date of Patent: May 17, 2005

(54) IN-WALL DISPLAY

(75) Inventor: Shane Zwezdaryk, 46 Hyde Ave., Apt. #2, Toronto, Ontario (CA), M6M 1J4

(73) Assignees: Shane Zwezdaryk, Toronto (CA); Joseph Dominelli, Toronto (CA)

( * ) Notice: Subject to any disclaimer, the term of this patent is extended or adjusted under 35 U.S.C. 154(b) by 0 days.

(21) Appl. No.: 10/462,776

(22) Filed: Jun. 17, 2003

(65) Prior Publication Data

US 2004/0163606 A1 Aug. 26, 2004

(30) Foreign Application Priority Data

Feb. 21, 2003 (CA) .............................................. 2419518

(51) Int. Cl.⁷ .......................... A01K 1/00; A01K 61/00
(52) U.S. Cl. ...................... 119/257; 119/269; 119/452; 119/473
(58) Field of Search ................................. 119/257, 245, 119/246, 247, 253, 269, 452, 455, 473; D30/101, 106

(56) References Cited

U.S. PATENT DOCUMENTS

| | | | | |
|---|---|---|---|---|
| 3,738,323 A | * | 6/1973 | Boterweg | 119/456 |
| 3,774,575 A | * | 11/1973 | Patterson | 119/245 |
| 4,023,531 A | * | 5/1977 | Thompson | 119/458 |
| 4,353,327 A | * | 10/1982 | Shroyer | 119/257 |
| 4,448,152 A | * | 5/1984 | Niki | 119/451 |
| 4,697,694 A | * | 10/1987 | Huber | 198/782 |
| 5,435,270 A | * | 7/1995 | Newman | 119/257 |
| 5,469,807 A | * | 11/1995 | Kosmaczeska | 119/484 |
| 5,513,596 A | * | 5/1996 | Coiro et al. | 119/457 |
| 5,551,378 A | * | 9/1996 | Dewalt | 119/247 |
| 5,649,757 A | * | 7/1997 | Aleman et al. | 362/101 |
| 5,950,563 A | * | 9/1999 | Adcock, Jr. | 119/246 |
| 6,065,849 A | * | 5/2000 | Chen | 362/101 |
| 6,158,387 A | * | 12/2000 | Gabriel et al. | 119/419 |

* cited by examiner

*Primary Examiner*—Yvonne R. Abbott
(74) *Attorney, Agent, or Firm*—Gowling Lafleur Henderson LLP (57) ABSTRACT

An in-wall display assembly is provided for mounting in a passage extending at least partway through a wall. The display assembly has a chamber with opposite front and rear walls, opposite end walls extending between the front and rear walls, an open top defined by the front, rear and end walls and a bottom opposite the top. At least one of the front and rear walls is transparent. The display assembly includes a mounting assembly securable to opposite sides of the passage for mounting the chamber to the opposite sides of the passage. The mounting assembly is movable between an in-wall configuration wherein the chamber is disposed in the passage and an access position wherein at least the top of the vessel extends from the wall to provide access to its interior.

8 Claims, 11 Drawing Sheets

IN-WALL DISPLAY

FIELD OF THE INVENTION

This invention relates generally to display chambers and their related mounting hardware. More particularly this invention relates to transparent faced display chambers for "in-wall" or "through-wall" display mounting assemblies for securing such chambers in position while allowing at least partial removal for access to their interiors.

BACKGROUND OF THE INVENTION

Display chambers such as fish tanks ("aquariums") and terrariums are conventionally supported on tables or shelves. Such support has various disadvantages including the requisite room and, particularly with tables, a less than optimum viewing height requiring a viewer to bend or stoop in order to look through rather than down into the chamber.

"On-wall" terrariums and aquariums have been proposed (see for example U.S. Pat. Nos. 5,878,694 and 5,435,270) however these in effect do little more than dispense with the need for a wall mounted shelf for their support. Such units still project into the room in which they are mounted to the full extent of their depth and do not provide for "through-wall" viewing (i.e. from opposite sides of a given wall).

It is an object of the present invention to provide a display chamber, such as a terrarium or aquarium which may be mounted into or through a wall so as to minimize protrusion of the chamber from the wall.

It is a further object of the present invention to provide a mounting assembly for such a display chamber which facilitates access to the interior of the display chamber or even removal of the chamber itself for tending to any display therein.

SUMMARY OF THE INVENTION

An in-wall display assembly is provided for mounting in a passage extending at least partway through a wall. The display assembly has a chamber with opposite front and rear walls, opposite end walls extending between the front and rear walls, an open top defined by the front, rear and end walls and a bottom opposite the top. At least one of the front and rear walls is transparent. The display assembly includes a mounting assembly securable to opposite sides of the passage for mounting the chamber to the opposite sides of the passage. The mounting assembly is movable between an in-wall configuration wherein the chamber is disposed in the passage and an access position wherein at least the top of the vessel extends from the wall to provide access to its interior.

The mounting assembly may be an open faced support frame which receives the chamber and respective slide brackets secured at one end to opposite sides of the support frame and securable at an opposite end to the opposite sides of the passage.

A flashing may be provided which is securable to a front face of the support frame for extending thereabout to cover the front face of the support frame and any gap between the support frame and the wall.

The front wall may be of mesh and the rear wall of glass for the chamber to house a terrarium.

Alternatively, the chamber may be an aquarium for housing an aquatic display having at least a front wall of glass.

Both the front and rear walls may be of glass to enable viewing from opposite sides of a wall.

A lid may be securable over the open top and fitted with a light for shining into the aquarium. Ventilation passages may extend through the lid and through the flashing which fluidly communicate through ventilation conduit.

DESCRIPTION OF DRAWINGS

Preferred embodiments of the present invention are described in detail below with reference to the accompanying illustrations in which.

DESCRIPTION OF PREFERRED EMBODIMENTS

Figure 1:
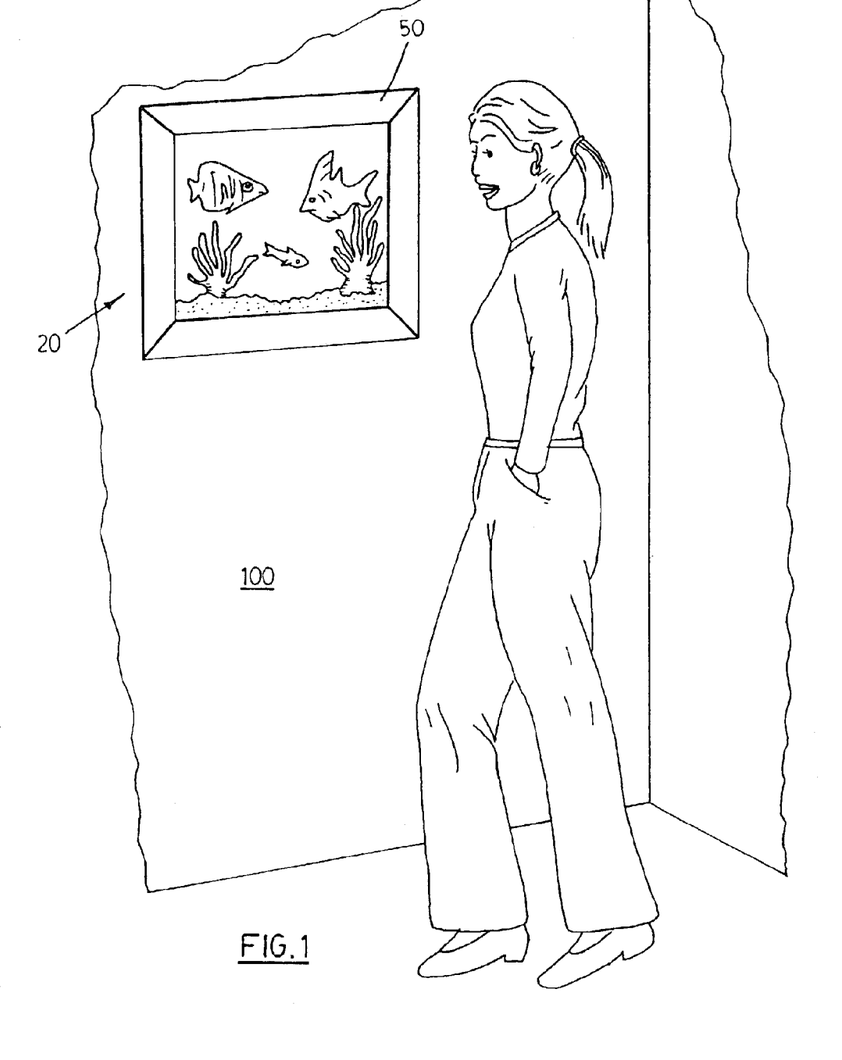
FIG. 1 is a perspective view illustrating an in-wall display assembly according to the present invention mounted in a wall.

A display assembly according to the present invention is generally indicated by reference 20 in the accompanying illustrations. FIG. 1 illustrates the display assembly 20 mounted in a wall 100 at a desired height, preferably at about eye level.

Figure 4:
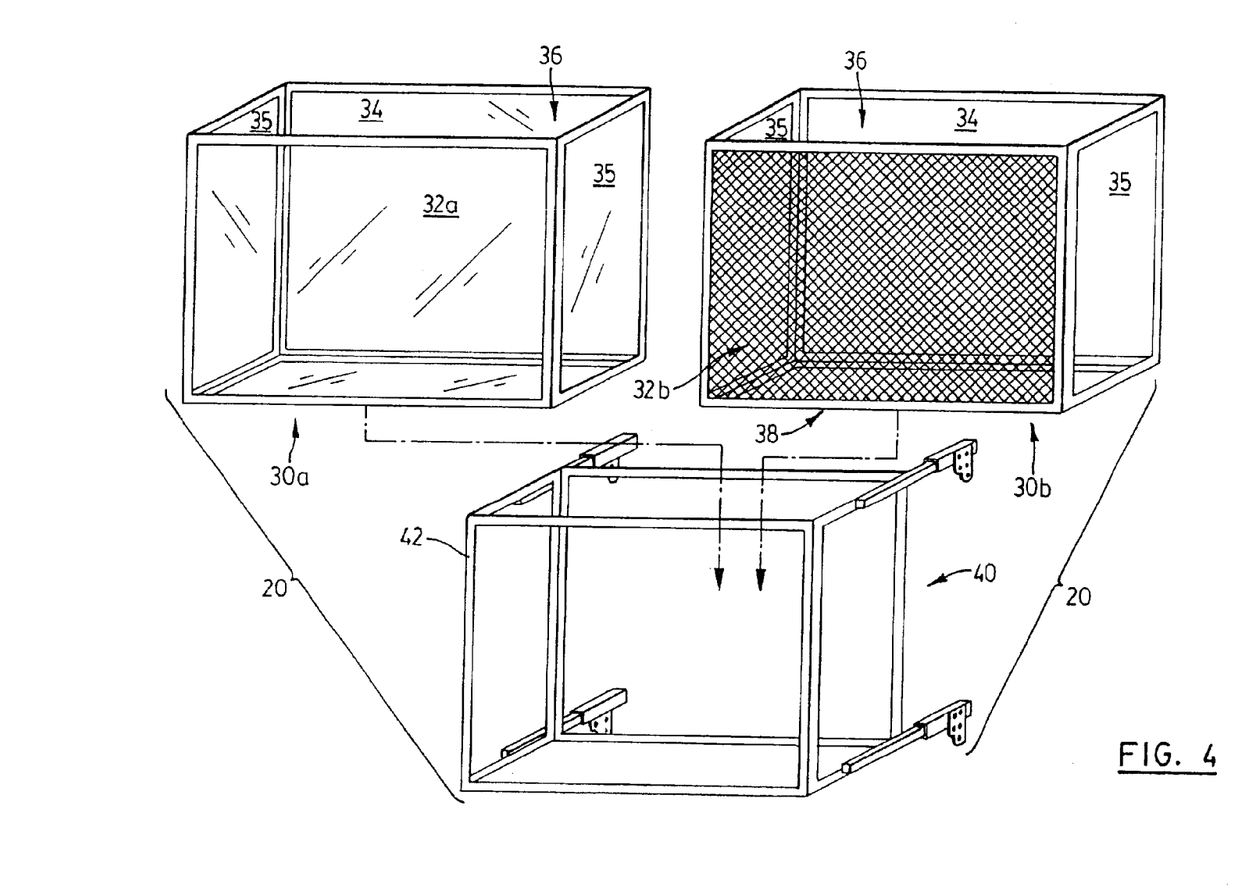
FIG. 4 is a perspective view illustrating two alternative chambers at the top of the figure for use with a mounting assembly at the bottom.
Figure 5:
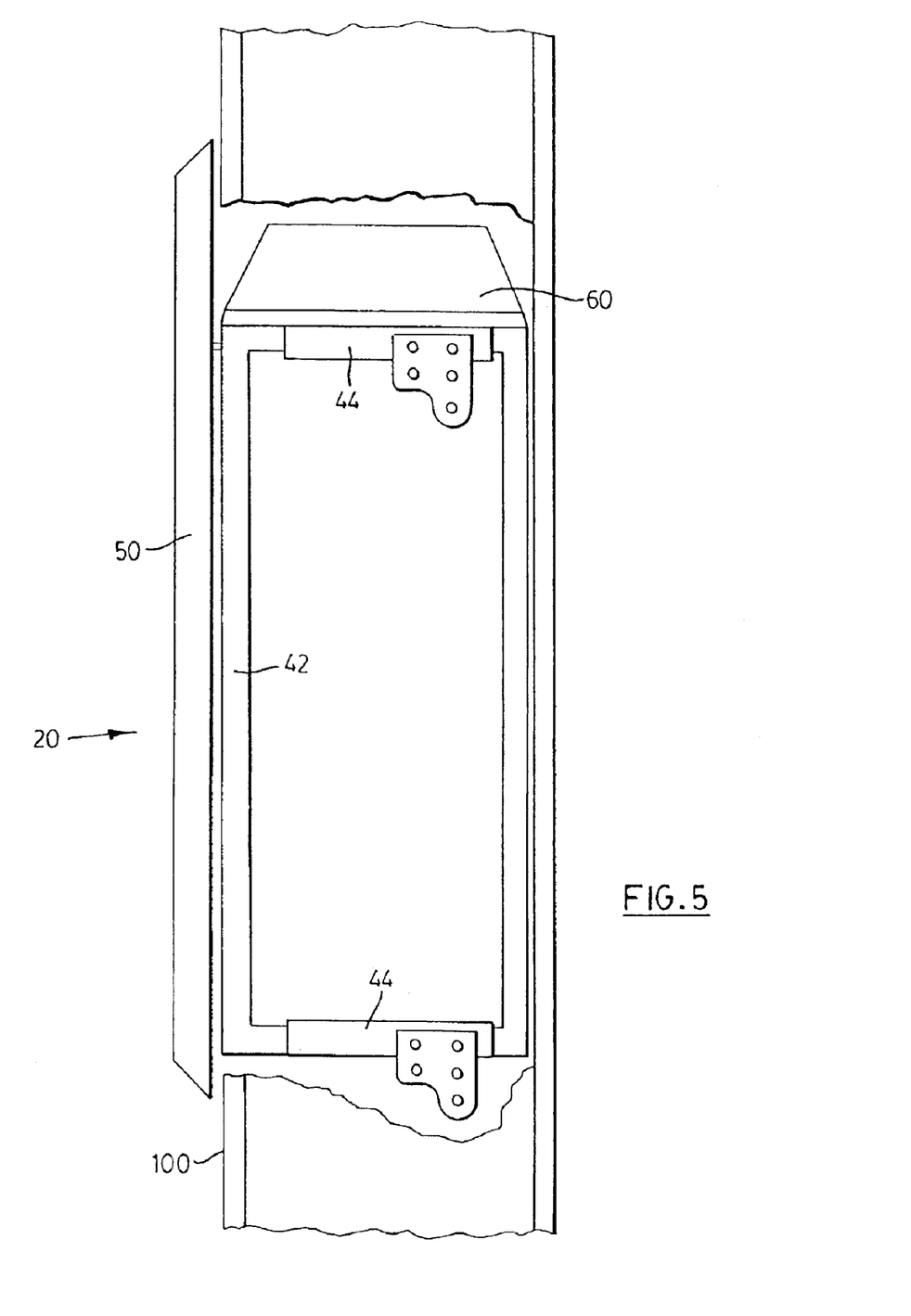
FIG. 5 is a perspective view from one side illustrating a flush mounted embodiment of display assembly according to the present invention.
Figure 6:
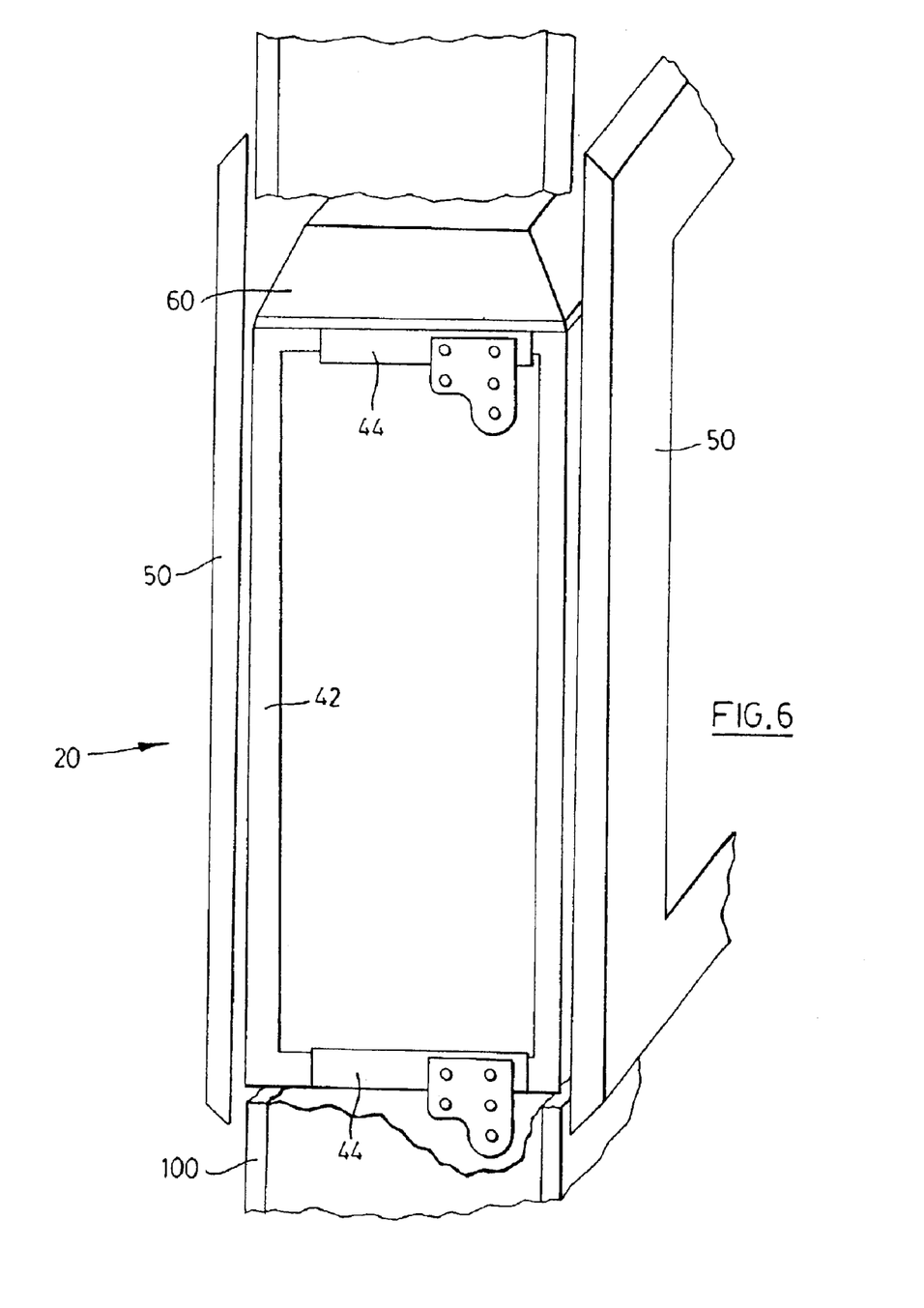
FIG. 6 is a perspective view illustrating a two-sided display assembly according to the present invention.

As illustrated in FIG. 4, the display assembly 20 may include a chamber 30a or 30b and a mounting assembly 40. The chamber 30a or 30b has a front wall 32a or 32b respectively, a rear wall 34 opposite the front wall 32a or 32b, and opposite end walls 35 extending between the front wall 32a or 32b and the rear wall 34. The chamber 30 further has an open top 36 defined by the front wall 32a or 32b, the rear wall 34 and the end walls 35. The display chamber 30 also has a bottom 38 opposite the top 36.

The mounting assembly 40 may have an open faced support frame 42 and include slide brackets 44 for mounting the support frame 42 to a passage 110 into or through the wall 100. The slide brackets 42 may be of any known suitable type, such as for example commonly used as drawer slides. The slide brackets 42 are secured at one end 46 to the support frame 42 and are securable at an opposite end 48 to opposite sides 112 of the passage.

Four slide brackets 44 (two on each side) are illustrated in the drawings. It may be possible to have but one on each side although four are expected to yield a sturdier structure. The slide brackets 44 act as a mounting assembly and are moveable between an "in-wall" configuration wherein the chamber 30 is in the wall 100 and an "access position" wherein the chamber 30 is slid out of the wall to permit access to the open top 36 at least for cleaning but preferably also for removal/insertion of the chamber 30. Preferably the brackets selected will have some form of detent means to avoid inadvertent separation of the frame 42 from the balance of the mounting assembly 40.

The support frame 42 may receive the chamber 30*a* or 30*b* as illustrated in FIG. 4. The chambers 30*a* and 30*b* have transparent front walls with the front wall 32*a* being of glass and the front wall 32*b* being of mesh. The chamber 30*a* is an aquarium. The chamber 30*b* is a terrarium. Either of chamber 30*a* or 30*b* may be received in the support frame 42, the open faced nature of which doesn't substantially affect viewing into the chamber 30 through its front wall 32*a* or 32*b*.

The rear wall 34 may also be transparent, particularly where viewing is desired from opposite sides, such as in a through wall installation or where a "background" sheet is to be placed over the rear wall 34 to add scenery viewable through the front wall 32*a* or 32*b*.

The passage 110 may be an opening cut between two or more studs 114, in which case the display assembly 110 should preferably be dimensioned to correspond to conventional stud spacing, which is generally on the order of 16¾ inches on centre. Should any studs need to be cut for installation, proper steps should be taken to maintain structural integrity such as by the use of appropriate bracing.

Figure 7:
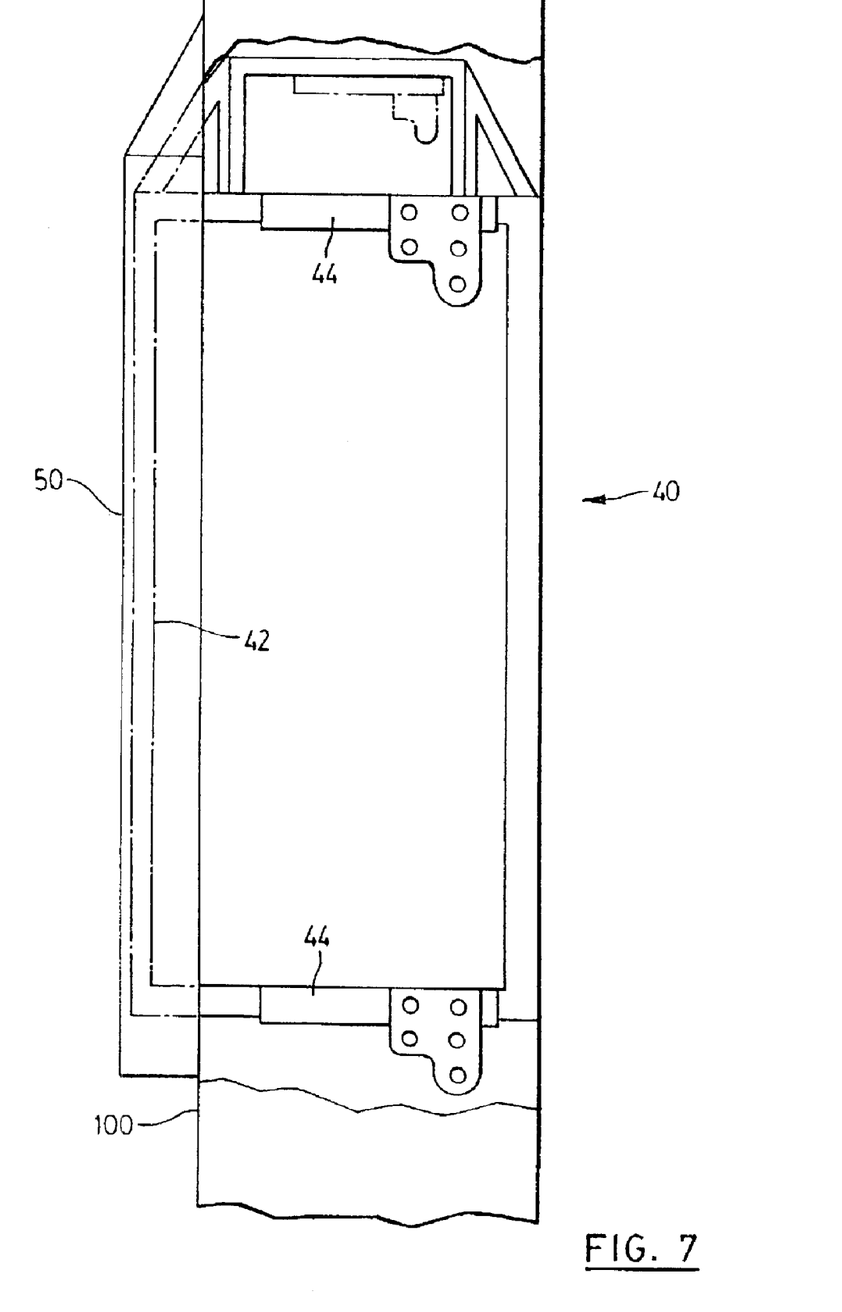
FIG. 7 is a perspective view illustrating an alternate embodiment display assembly according to the present invention which extends from a wall to which it is mounted.
Figure 8:
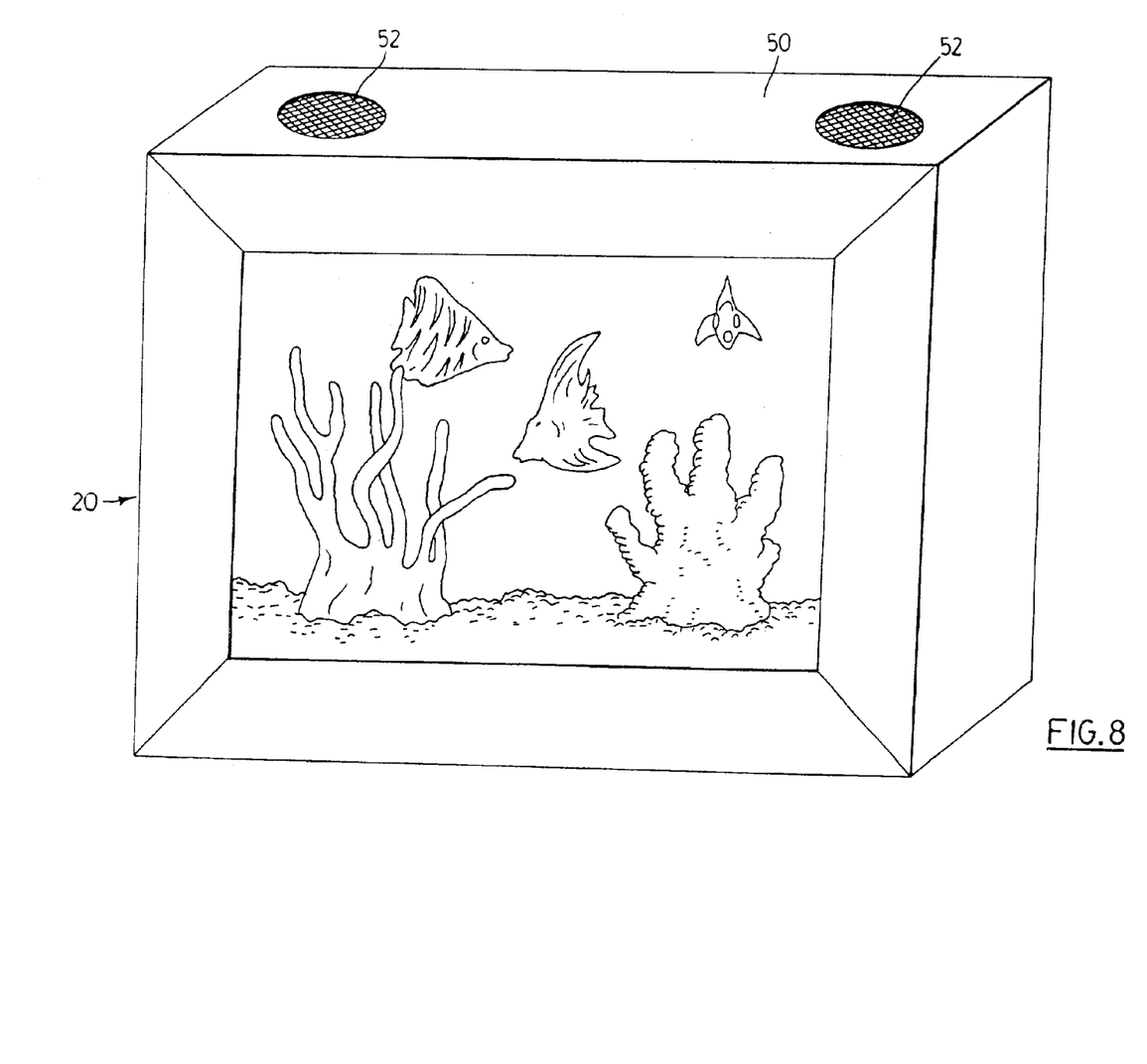
FIG. 8 is a perspective view illustrating a chamber of a display assembly according to the present invention having a ventilated top.
Figure 9:
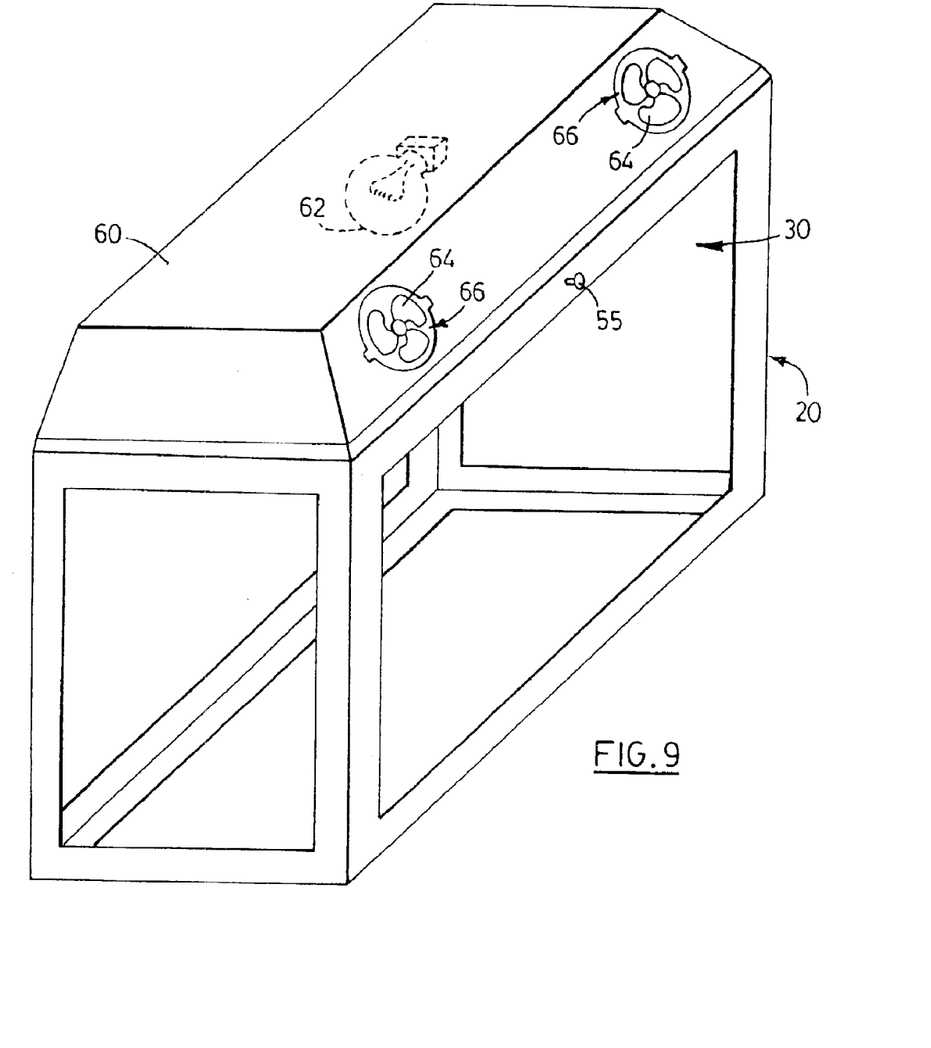
FIG. 9 is a view corresponding to FIG. 8 but showing components not visible in FIG. 8.
Figure 10:
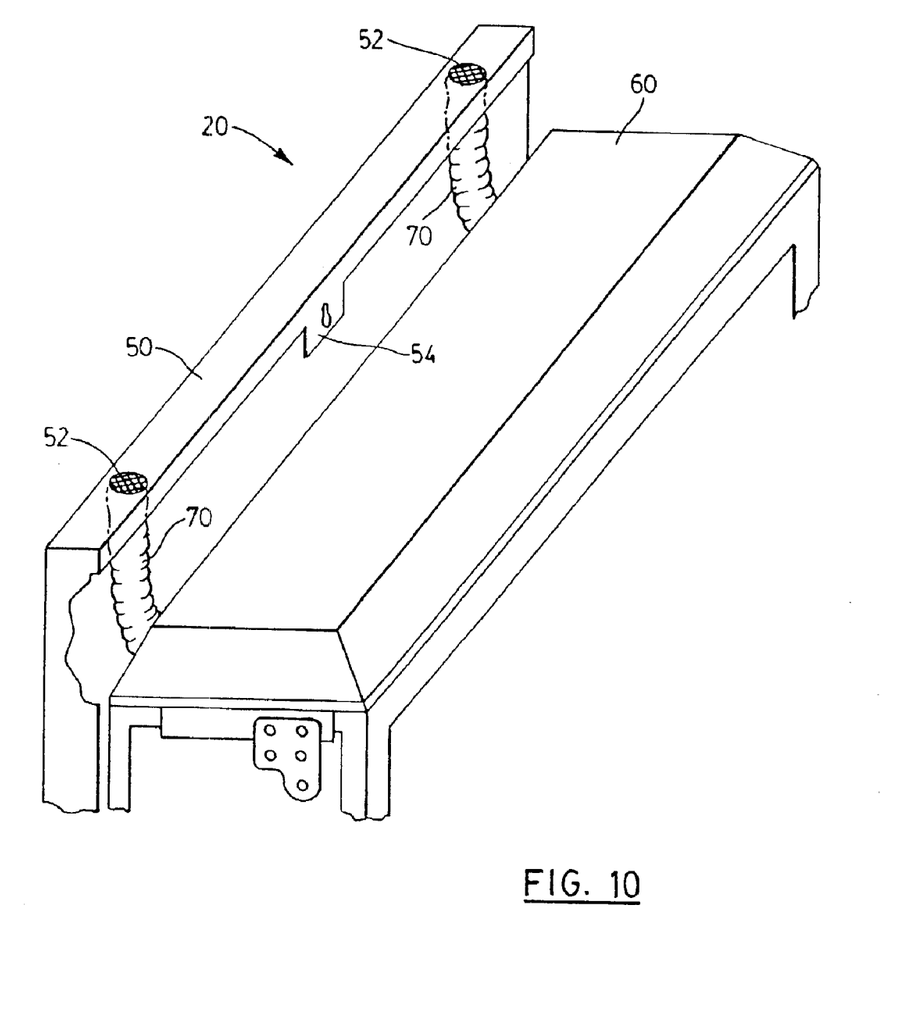
FIG. 10 is a perspective view, partially cut away illustrating ventilation conduit extending between a top and a frame of a display assembly according to the present invention; and, FIG. 11 is a perspective view corresponding to FIG. 9 but showing an alternate configuration for the ventilated top.

To improve the finished appearance of the display assembly 20, a flashing 50 may be provided for covering the mounting assembly 40 and the gap between the passage 110 in the wall 100 and the mounting assembly 40. The flashing 50 may be in the form of a picture frame as illustrated and be securable to the mounting assembly 40 or the wall 100 adjacent the passage 110 such as by a hook or tab 54. A peg 55 may be provided on the support frame 42 for engaging a hole in the tab 54. For greater depth, the chamber 30 may project into the flashing 50 as illustrated in FIG. 7.

For some applications it may be desirable to provide at least one of heat and ventilation to the chamber 30. This may be accomplished by providing a lid 60 to the chamber 30 with a lamp 62 and one or more ventilation fans 64. The lid 60 further has lid ventilation passages 66 extending through it. The flashing 50 may be provided with flashing ventilation passages 52 therethrough and ventilation conduit 70 may be used to provide fluid communication between the lid ventilation passages 66 and the flashing ventilation passages 52.

Figure 2:
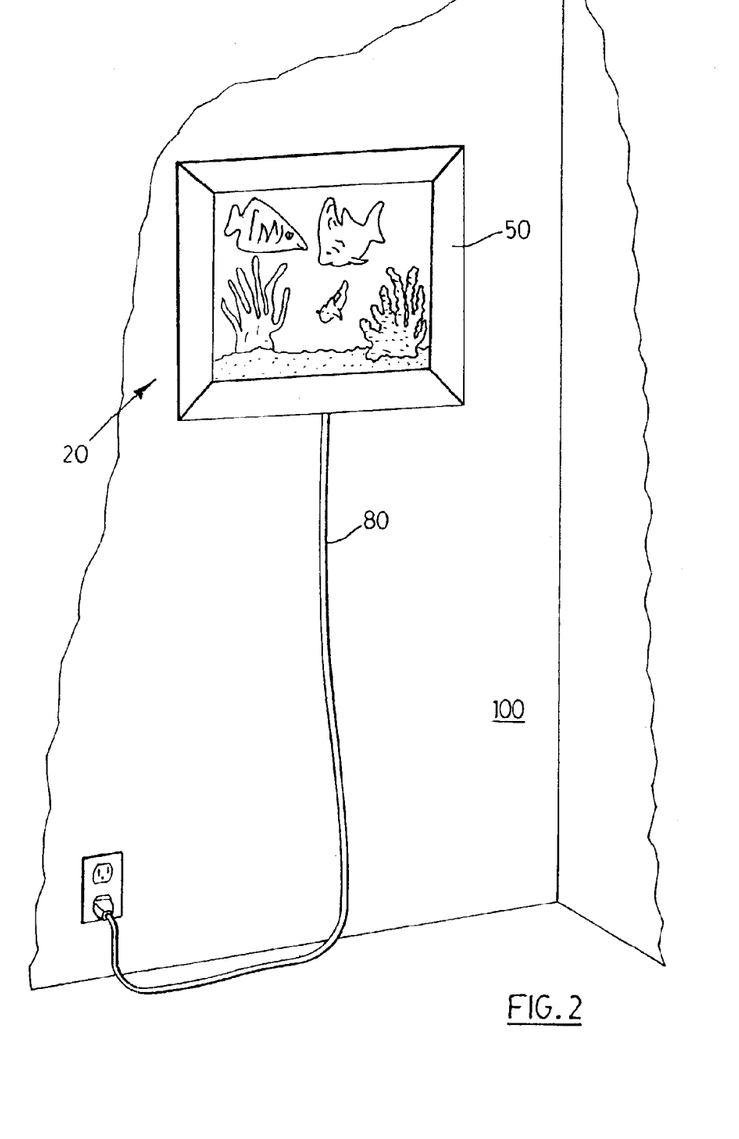
FIG. 2 is a view corresponding to FIG. 1 but also illustrating a power cord.
Figure 3:
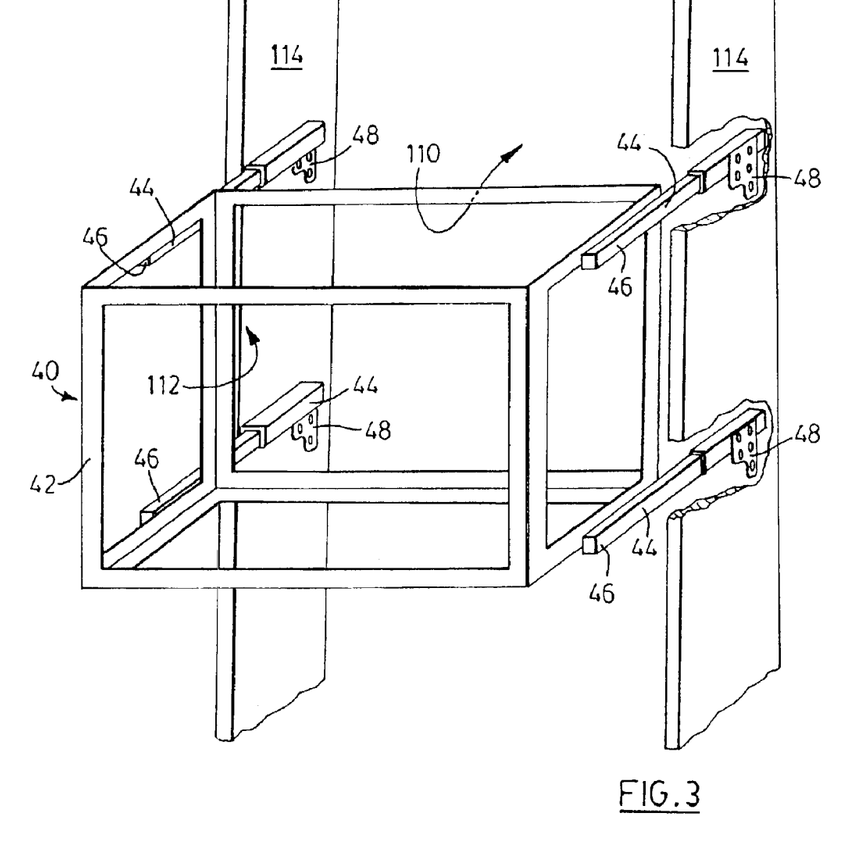
FIG. 3 is a perspective view illustrating a mounting assembly according to the present invention.

Preferably electrical connection for the ventilation fan 64 and the light 62 will be made in the wall 100. For simpler "do-it-yourself" installation however an external electrical cord 80 may be provided as illustrated in FIG. 2.

Figure 11:
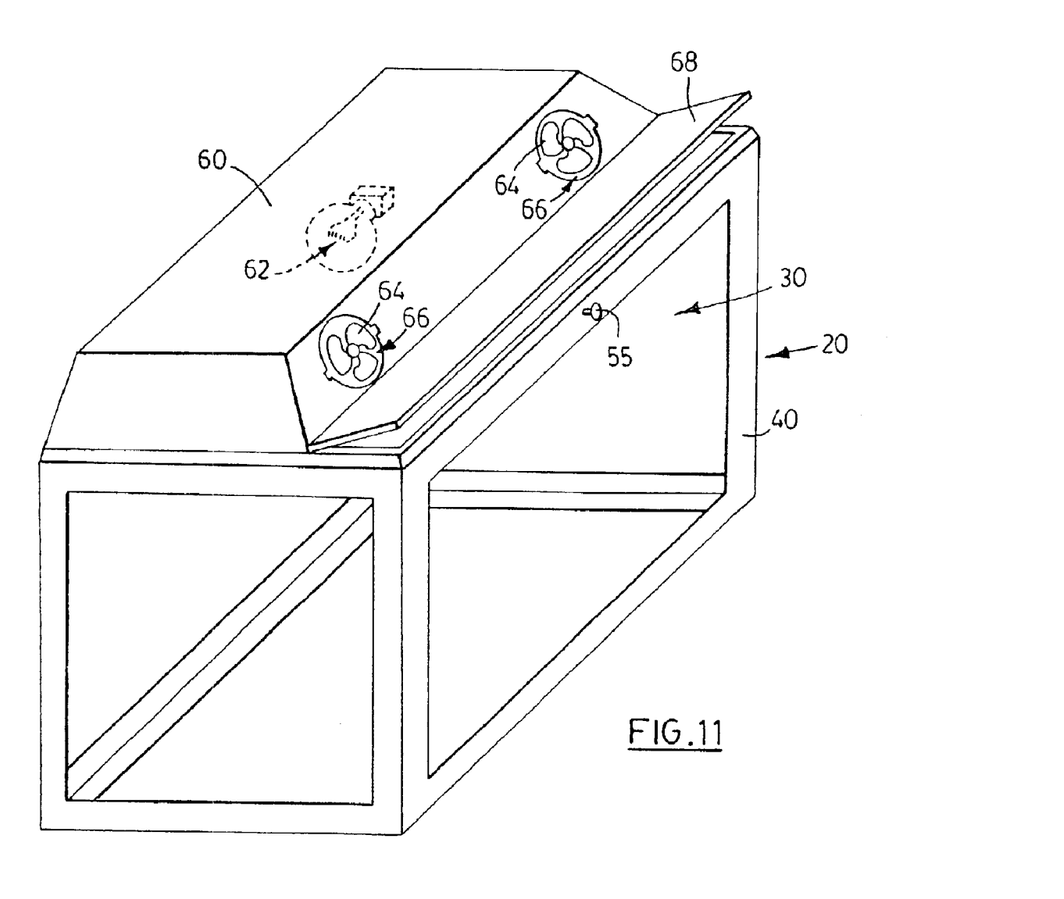

FIG. 11 illustrates an alternate embodiment for the lid 60 incorporating a hinged access panel 68 at its front. The access panel 68 may be raised as illustrated to enable food or other substances to be delivered to the chamber 30 without having to completely withdraw it from the wall to enable removal of the lid 60.

The above description is intended in an illustrative rather than a restrictive sense. Variations may be apparent to those skilled in such structures without departing from the spirit and scope of the invention as defined by the claims set out below. For example, a mounting assembly other than slide brackets may be useable in some applications, such as hinged attachment of the chamber 30 to the wall 100.

I claim:

1. An in-wall display assembly for mounting in a passage extending at least part way through a wall, said display assembly comprising:

a chamber having opposite front and rear walls, opposite end walls extending between said front and rear walls, an open top defined by said front, rear and end walls and a bottom opposite said top;

at least one of said front and rear walls being transparent;

a mounting assembly securable to opposite sides of said passage for mounting said chamber to said opposite sides of said passage, said mounting assembly being moveable between an in-wall configuration wherein said chamber is disposed in said passage and an access position wherein at least said top of said chamber extends from said wall to provide access to an interior of said chamber;

wherein said mounting assembly includes open faced support frame which receives said chamber and respective slide brackets secured to one end at opposite sides of said support frame and securable at an opposite end to said opposite sides of said passage.

2. The in-wall display assembly of claim 1 further having:

a flashing securable adjacent to said front face of said support frame to extend thereabout to cover said front face of said support frame and any gap between said support frame and said wall.

3. The in-wall display assembly of claim 2 wherein:

said front wall is of mesh for said chamber to house a terrarium.

4. The in-wall display of claim 2 wherein:

said chamber is an aquarium for housing an aquatic display.

5. The in-wall display of claim 4 wherein:

at least said front wall is of glass.

6. The in-wall display of claim 5 further having:

a lid over said open top, said lid being fitted with a light for shining into said aquarium and lid ventilation passages extending therethrough;

flashing ventilation passages extending through said flashing; and, ventilation conduit providing fluid communication between said lid ventilation passages and said flashing ventilation passages.

7. The in-wall display of claim 6 wherein:

said front and rear walls are of glass.

8. The in-wall display of claim 4 wherein:

said front end rear walls are of glass.

* * * * *